(12) United States Patent
Albou

(10) Patent No.: US 6,736,524 B2
(45) Date of Patent: May 18, 2004

(54) ELLIPTICAL HEADLIGHT COMPRISING A SECONDARY LIGHT SOURCE

(75) Inventor: Pierre Albou, Bobigny (FR)

(73) Assignee: Valeo Vision, Bobigny Cedex (FR)

( * ) Notice: Subject to any disclaimer, the term of this patent is extended or adjusted under 35 U.S.C. 154(b) by 0 days.

(21) Appl. No.: 10/454,659

(22) Filed: Jun. 3, 2003

(65) Prior Publication Data

US 2003/0223246 A1 Dec. 4, 2003

(30) Foreign Application Priority Data

Jun. 4, 2002 (FR) .............................. 02 06927

(51) Int. Cl.$^7$ ............................................... F21V 13/12
(52) U.S. Cl. ...................... 362/228; 362/248; 362/242; 362/243; 362/543; 362/544; 362/545; 362/538
(58) Field of Search ................................ 362/228, 248, 362/242, 243, 538, 539, 543, 544, 545

(56) References Cited

U.S. PATENT DOCUMENTS

| | | |
|---|---|---|
| 4,722,037 A | 1/1988 | Davis |
| 5,180,218 A * | 1/1993 | Ohshio ........................ 362/538 |
| 5,997,163 A | 12/1999 | Brown |
| 6,015,220 A | 1/2000 | Blusseau |

FOREIGN PATENT DOCUMENTS

| | | |
|---|---|---|
| DE | 10030632 A1 | 1/2002 |
| EP | 0603861 A1 | 6/1994 |
| FR | 2769688 | 4/1999 |
| JP | 04043501 | 2/1992 |
| JP | 10261303 | 9/1998 |

* cited by examiner

Primary Examiner—Alan Cariaso
Assistant Examiner—Mark Tsidulko
(74) Attorney, Agent, or Firm—Morgan & Finnegan, LLP

(57) ABSTRACT

The invention proposes a headlight producing a principal lighting beam with cutoff, comprising a principal light source which is arranged in the vicinity of a first focus of the reflector, a shield which comprises a cutoff edge arranged in the vicinity of a second focus of the reflector, so as to form the cutoff in the principal lighting beam, and a convergent lens, a focal plane of which passes close to the second focus of the reflector, a secondary light source being arranged between the shield and the lens; comprising an optical distribution element arranged in front of the shield, so as to distribute the light rays emitted by the secondary source on the input surface of the principal lens, with a view of producing a secondary lighting beam, the secondary source being arranged outside the path of the light rays coming from the principal source and directed towards the input surface of the principal lens.

16 Claims, 1 Drawing Sheet

ELLIPTICAL HEADLIGHT COMPRISING A SECONDARY LIGHT SOURCE

The present invention concerns a motor vehicle headlight.

The present invention concerns more particularly a motor vehicle headlight which is designed to produce at least one regulatory principal lighting beam with cutoff, in particular of the dipped headlight type, comprising, arranged from rear to front roughly along a longitudinal optical axis, a reflector of the elliptical type, a principal light source which is arranged in the vicinity of a first focus of the reflector, a shield which comprises a cutoff edge arranged in the vicinity of a second focus of the reflector, so as to form the cutoff in the principal lighting beam produced by the headlight, and a principal convergent lens, a focal plane of which passes close to the second focus of the reflector, a second light source being arranged between the shield and the principal lens.

Vehicles must now be equipped with lighting systems capable of fulfilling many lighting functions, each being adapted to particular traffic conditions.

One significant difficulty, in the integration of all these lighting functions in a vehicle, is the size of the headlights which are necessary for fulfilling all these functions. In particular, there is a need for increasing the number of lighting functions fulfilled by a headlight without increasing the apparent surface area of this headlight in the front face of the vehicle.

The invention aims to remedy this drawback by proposing a simple, economical and effective solution.

To this end, the invention proposes a motor vehicle headlight which is designed to produce at least one regulatory principal lighting beam with cutoff, in particular of the dipped headlight type, comprising, arranged from rear to front roughly along a longitudinal optical axis, a reflector of the elliptical type, a principal light source which is arranged in the vicinity of a first focus of the reflector, a shield which comprises a cutoff edge arranged in the vicinity of a second focus of the reflector, so as to form the cutoff in the principal lighting beam produced by the headlight, and a principal convergent lens, a focal plane of which passes close to the second focus of the reflector, a secondary light source being arranged between the shield and the principal lens, characterised in that it comprises an optical distribution element which is arranged in front of the shield, so as to distribute the light rays emitted by the secondary source on the input surface of the principal lens, with a view to producing a secondary lighting beam, the secondary source being arranged outside the path of the light rays coming from the principal source and directed towards the input surface of the principal lens.

According to other characteristics of the invention:

the optical distribution element is arranged in the vicinity of the focus of the principal lens;

the optical distribution element comprises a support provided with an anisotropic coating which diffuses in a controlled manner the light energy received from the secondary source towards the input surface of the principal lens;

the anisotropic coating comprises a network of elementary diffusion patterns produced in isotropic material;

the optical distribution element comprises a mirror;

the optical distribution element comprises a hologram forming a mirror;

the optical distribution element is carried by the front face of the shield;

the portion of the shield carrying the optical distribution element has a curved profile, in a longitudinal vertical plane, with a view to distributing the light rays emitted by the secondary source on the input surface of the principal lens;

the secondary source comprises an optical concentration element, so as to concentrate the light rays emitted by the secondary source on the optical distribution element;

the optical concentration element comprises a secondary convergent lens;

the optical concentration element comprises a hologram;

the secondary source is a laser diode which produces an infrared lighting beam.

Other characteristics and advantages of the invention will emerge from a reading of the following detailed description, for an understanding of which reference will be made to the accompanying drawings, amongst which:

In the remainder of the description, identical or similar elements are as far as possible referenced by the same reference signs.

FIG. 1 depicts a headlight 10 for a motor vehicle which is produced in accordance with the teachings of the invention.

In a conventional manner, the headlight 10 comprises a principal light source, here in the form of a lamp 12 with a filament 16, which is mounted in the bottom of a principal reflector 14 of the elliptical type, so that the filament 16 of the lamp 12 or the arc of the discharge lamp is situated in the vicinity of a first focus F1 of the reflector 14.

Figure 1:
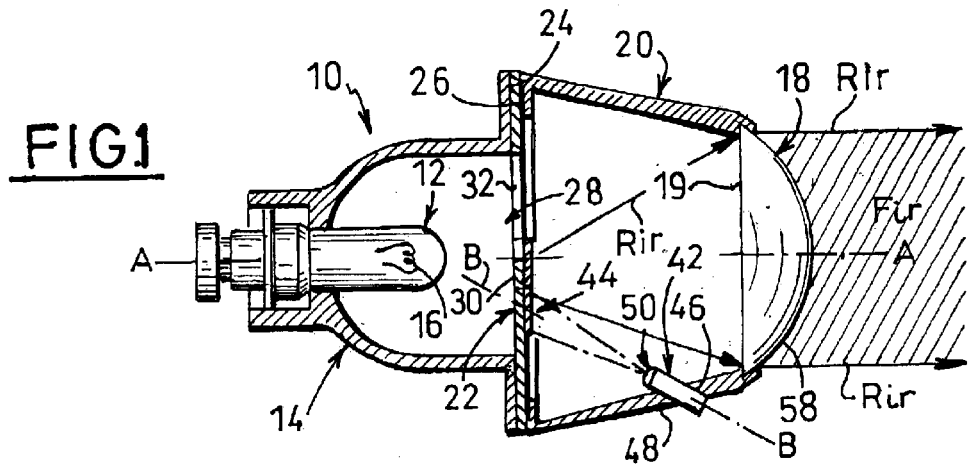
FIG. 1 is a view in axial section which depicts a headlight according to the teachings of the invention.

In the remainder of the description, an orientation from rear to front, along the principal optical axis A—A of the headlight 10, which corresponds to an orientation from left to right as seen in FIG. 1, will be used non-limitingly. The principal optical axis A—A is roughly parallel to the longitudinal axis of the vehicle equipped by the headlight 10.

The principal optical axis A—A is here substantially horizontal and can be defined for example by the two foci F1, F2 of the elliptical reflector 14.

An orientation from top to bottom along a vertical axis, as seen in FIG. 1, will also be used non-limitingly.

The headlight 10 comprises a convergent lens 18 which is mounted, at the front, in a framework element 20 of the headlight 10 fixed to the front of the reflector 14.

In the embodiment depicted here, the headlight 10 is designed to produce a principal lighting beam fulfilling a dipped headlight function $F_c$. The headlight 10 comprises for this purpose an obscuring device, or shield 22, which is interposed axially between the front transverse surface 24 of the principal reflector 14 and the rear transverse surface 26 of the framework element 20. The shield 22 is arranged substantially in the focal plane of the principal lens 18.

The shield 22 has here the form of a metallic plate, oriented roughly transversely with respect to the principal optical axis A—A, which comprises, in the bottom half of the exit opening 28 of the reflector 14, an obscuring part 30, and in the top half of the exit opening 28 of the reflector 14, a window 32 for the light rays to pass.

The obscuring part 30 of the shield 22 comprises a top transverse edge 34, referred to as the cutoff edge, which is arranged in the vicinity of the second focus F2 of the reflector 14.

The cutoff edge 34 aims to form, in the principal lighting beam, a directional limit, or cutoff, beyond which the light intensity emitted is low.

Figure 2:
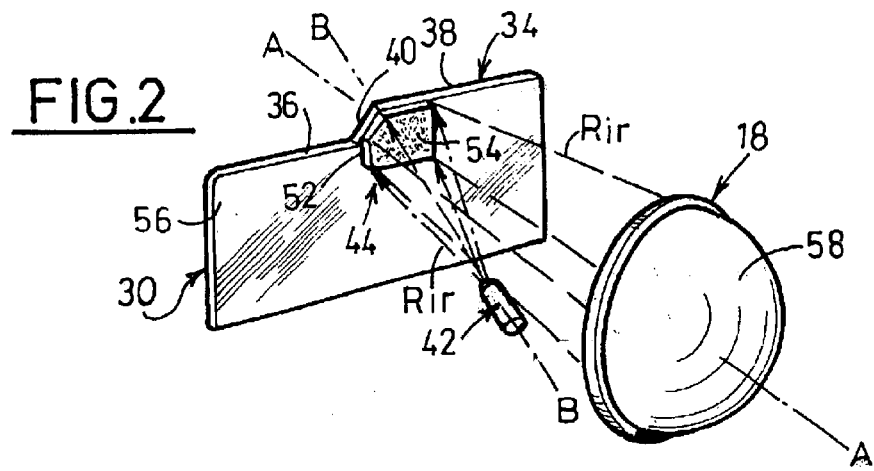
FIG. 2 is a view in perspective which shows schematically the arrangement of the optical distribution element with respect to the secondary light source and with respect to the lens of the headlight of FIG. 1.

The obscuring part 30 of the shield 22 is depicted schematically in FIG. 2.

In the embodiment depicted here, the shield 22 is designed to fulfil a regulatory dipped headlight lighting function. The cutoff edge 34 therefore comprises two horizontal portions 36, 38, which are offset vertically and which are connected by an inclined portion 40 with a given angle with respect to the horizontal portions 36, 38, so that the headlight 10 produces a regulatory dipped headlight lighting beam $F_c$.

Figure 3:
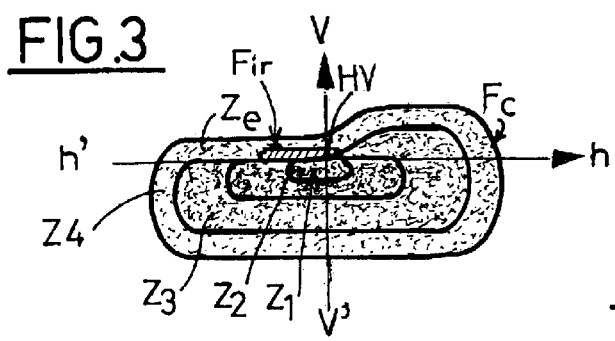
FIG. 3 is a diagram which shows the dipped headlight and infrared beam produced by the headlight of FIG. 1.

FIG. 3 depicts schematically the form of the regulatory dipped headlight beam $F_c$ produced on a screen by the headlight 10.

In accordance with the teachings of the invention, the headlight 10 comprises a secondary light source 42 which is arranged axially between the shield 22 and the lens 18.

The headlight 10 also comprises an optical distribution element 44 which is arranged in front of the shield 22, so as to distribute the light rays emitted by the secondary source on the entry surface 19 of the lens 18, with a view to producing a secondary light beam.

Advantageously, the optical distribution element 44 is arranged in the vicinity of the focus F2 of the lens 18.

Some vehicles can be equipped with a headlight for producing an infrared lighting beam $F_{ir}$.

The infrared lighting beam $F_{ir}$ is generally used for illuminating axially in front of the dipped beam $F_c$ and, combined with an infrared light sensor (not shown), for forming an image of any objects detected, on a monitoring screen (not shown) arranged in the vehicle cabin.

It is particularly difficult to integrate a lighting function of the infrared light type, which is invisible, in a vehicle, because of the danger represented by the observation of infrared radiation by a human eye.

The headlight 10 according to the invention is particularly advantageous for producing a lighting beam $F_{ir}$ of the infrared light type, the infrared beam $F_{ir}$ leaving the headlight 10 through the same exit surface as a principal lighting beam in visible light.

To this end, the secondary light source 42 is advantageously a laser diode which is designed to produce a secondary lighting beam $F_{ir}$ of the infrared type.

The laser diode 42 is here arranged in a housing 46, which is produced in a bottom part 48 of the framework element 20.

Advantageously, the laser diode 42 is arranged outside the path of the light rays issuing from the lamp 12 and passing the shield 22 in order to reach the entry surface 19 of the lens 18.

The laser diode 42 comprises here an optical element 50 which is designed to direct the infrared rays emitted by the laser diode 42 onto the optical distribution element 44.

The optical element 50 is for example a convergent lens, or a diffractive optical element such as a hologram, which can be bonded to the laser diode 42.

The infrared rays $R_{ir}$ are therefore emitted, at the exit from the optical element 50, roughly in a light diffusion direction B—B, which is inclined with respect to the principal optical axis A—A and which is oriented from the diode 42 towards the optical distribution element 44, that is to say here from front to rear.

Advantageously, the optical distribution element 44 is an anisotropic diffuser.

An anisotropic diffuser generally comprises a support coated with an isotropic material, for example magnesium oxide, in which there is etched a network of elementary optical diffusion patterns, according to an etching technique similar to the techniques used in microelectronics.

The anisotropic diffuser is designed so as to return the light which it receives in a controlled manner, in a solid diffusion angle.

In the context of the present invention, the anisotropic diffuser 44, which is arranged in the vicinity of the focus F2 of the lens 18, is chosen so that its solid diffusion angle corresponds roughly to the solid angle of the lens 18, that is to say the solid angle defined by the focus F2 of the lens 18 and the entry surface 19 of the lens 18.

According to the embodiment depicted here, the diffuser 44 comprises a support plate 52 substantially transverse with respect to the principal optical axis A—A, which is provided on its front face 54 with an anisotropic coating.

The diffuser 44 is here fixed to the front face 56 of the obscuring part 30 of the shield 22, close to the principal optical axis A—A, and the diffuser 44 is substantially adjacent to the cutoff edge 34 of the shield 22.

The functioning of the headlight 10 according to the invention is as follows.

When the lamp 12 is on, the reflector 14, the shield 22 and the lens 18 cooperate in a conventional manner in order to produce, from the light rays emitted by the filament 16, a regulatory dipped beam $F_c$.

The light rays forming the dipped beam $F_c$ leave the headlight 10 through the exit surface 58, or front surface, of the lens 18.

The illumination produced by a dipped beam $F_c$ on a screen placed at approximately twenty-five meters in front of the headlight 10 is shown in FIG. 3, in the case of vehicle travel on the right on a road.

By way of example, the figure shows four zones Z1, Z2, Z3, Z4, which have respectively an increasing mean light intensity, from the point HV, representing the intersection of the horizontal axis h'h with the vertical axis v'v, towards one side of the horizontal axis h'h.

Overall, the dipped beam $F_c$ is delimited vertically towards the top by its cutoff, which follows the horizontal axis h'h, from left to right, as far as the point HV, and is then inclined upwards, with respect to the horizontal axis h'h, by an angle of approximately fifteen degrees.

However, it can be seen that the zone of weakest intensity Z4 of the dipped beam $F_c$ comprises a portion Ze, or dazzle zone, situated above the cutoff.

This dazzle zone Ze corresponds to the light rays which are emitted above the cutoff and which are the source of dazzling for the drivers of vehicles travelling in the opposite direction. This dazzle zone Ze, of low light intensity, is imposed by regulations with a view to allowing a progressive transition between the zones not illuminated by the dipped beam $F_c$ and the cutoff below which the light intensity is at a maximum, and also with a view to allowing observation of the road signs situated above the roadway, for example above a motorway.

When the laser diode 42 is on, it emits infrared radiation $R_{ir}$ directed by the lens 50 onto the front face 54 of the diffuser 44.

The diffuser 44 sends the infrared rays $R_{ir}$ onto the entry surface 19 of the lens 18.

Overall, for the lens 18, the infrared rays $R_{ir}$ come from a virtual light source situated in the vicinity of its focus F2, so that the infrared rays $R_{ir}$ are diverted by the lens 18 so as to emerge through the exit surface 58 in directions substantially parallel to the principal optical axis A—A above the cutoff.

Advantageously, the laser diode 42 is switched on at the same time as the lamp 12, and the infrared beam $F_{ir}$, which is depicted schematically in FIG. 3, is emitted in the dazzling zone Ze of the dipped beam $F_c$. This positioning of the infrared beam $F_{ir}$ prevents the drivers of vehicles travelling in the opposite direction from directly looking at the infrared beam $F_{ir}$, because of the pupil reflex caused in them by the visible light rays emitted in the dazzle zone Ze by the lamp 12.

The headlight 10 according to the invention therefore reduces the risk of a person directly observing the infrared light beam, without protection, since the infrared source 42 is isolated from the outside by the lens 18, and by the lens 50.

In addition, the infrared beam $F_{ir}$ leaves the headlight 10 through a surface 58 which has a large surface area, compared with the size of the secondary source 42, which provides a low luminance value, compared with an infrared light headlight housing an exit surface with a reduced area.

As the exit surface 58 of the headlight 10 is "illuminating" in terms of visible light, by means of the dipped beam $F_c$, the headlight 10 according to the invention reduces the risk of a person looking in the axis A—A of the infrared beam $F_{ir}$, towards its source 42.

Another advantage of the invention is that it allows the integration of an additional lighting function in the headlight 10, overall without increasing the size of the headlight 10, which facilitates the integration of the headlight 10 in a vehicle. In particular, the integration of the additional lighting function in the headlight 10 does not increase the apparent surface area of the headlight 10.

In addition, in the case where the headlight 10 is equipped with a range correction system (not shown) for the dipped beam $F_c$, the secondary lighting beam $F_{ir}$ benefits from this also.

Since the range correction system guarantees stable vertical positioning of the infrared beam $F_{ir}$, it is not necessary to vertically spread the infrared light energy in the beam $F_{ir}$, which improves the energy efficiency of the infrared lighting function.

Figure 4:
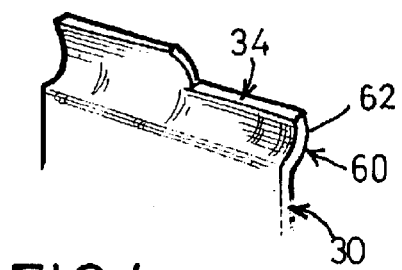
FIG. 4 is a view in perspective which shows schematically a variant embodiment of the shield equipping the headlight of FIG. 1.
Figure 5:
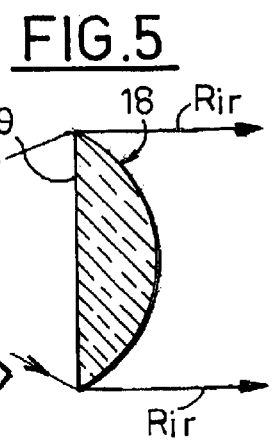
FIG. 5 is a view in axial section which shows schematically the variant embodiment in FIG. 4.

FIGS. 4 and 5 depict a variant embodiment of the invention, in which a top portion 60 of the obscuring part 30 of the shield 22 has a curved profile, in a projection on a vertical axial plane, which is convex axially towards the front.

The optical distribution element 44, which is carried by the front surface 62 of the top portion 60, comprises for example a reflective coating forming a mirror, and the profile of the arc of a circle of the top part 60 is defined so that the light rays $R_{ir}$ which it receives from the secondary source 42 are distributed overall over at least part of the entry surface 19 of the lens 18.

It should be noted that the profile of the top portion 60, in an axial projection on a vertical transverse plane, is similar to the corresponding profile of the shield 22 according to the embodiment described above, so that the cutoff edge 34 always delimits an adequate cutoff in the dipped beam $F_c$. In particular, the cutoff edge 34 must be arranged axially in the vicinity of the second focus F2 of the elliptical reflector 14, the bottom portion of the obscuring part 30 being arranged here axially at the rear, with respect to the second focus F2.

The invention has been described with reference to a headlight 10 producing a dipped beam $F_c$ and an infrared beam $F_{ir}$. Naturally, without departing from the field covered by the invention, the headlight 10 can be designed to produce another type of principal lighting beam with cutoff, for example a fog beam, and another type of secondary lighting beam, for example a sidelight beam. Likewise, the invention applies to a headlight emitting two types of beam, a dipped beam as described and a main beam, obtained by tilting the shield producing the cutoff, the infrared beam being emitted only when the shield is in the dipped beam position. The invention also applies to headlights emitting more than two beams using at least one obscuring screen, as described for example in the document FR-A-2 815 310.

What is claimed is:

1. A motor vehicle headlight which is designed to produce at least one regulatory principal lighting beam with cutoff, of the dipped headlight type, comprising, arranged from rear to front substantially along a longitudinal optical axis, a reflector of the elliptical type, a principal light source which is arranged in the vicinity of a first focus of the reflector, a shield which comprises a cutoff edge arranged in the vicinity of a second focus of the reflector, so as to form the cutoff in the principal lighting beam produced by the headlight, and a principal convergent lens, a focal plane of which passes close to the second focus of the reflector, a secondary light source being arranged between the shield and the principal lens, the headlight further comprising an optical distribution element which is arranged in front of the shield, so as to distribute the light rays emitted by the secondary source on the input surface of the principal lens, with a view to producing a secondary lighting beam, the secondary source being arranged outside the path of the light rays coming from the principal source and directed towards the input surface of the principal lens.

2. A headlight according to claim 1, wherein the the optical distribution element is arranged in the vicinity of the focus of the principal lens.

3. A headlight according to claim 2, wherein the optical distribution element comprises a mirror.

4. A headlight according to claim 2, wherein the optical distribution element comprises a hologram forming a mirror.

5. A headlight according to claim 1, wherein the optical distribution element comprises a support provided with an anisotropic coating which diffuses in a controlled manner the light energy received from the secondary source towards the input surface of the principal lens.

6. A headlight according to claim 5, wherein the the anisotropic coating comprises a network of elementary diffusion patterns produced in isotropic material.

7. A headlight according to claim 5, wherein the optical distribution element comprises a mirror.

8. A headlight according to claim 1, wherein the optical distribution element comprises a mirror.

9. A headlight according to claim 1, wherein the optical distribution element comprises a hologram forming a mirror.

10. A headlight according to claim 1, wherein the optical distribution element is carried by the front fact of the shield.

11. A headlight according to claim 1, wherein the portion of the shield carrying the optical distribution element has a curved profile, in a longitudinal vertical plane, with a view to distributing the light rays emitted by the secondary source on the input surface of the principal lens.

12. A headlight according to claim 1, wherein the secondary source comprises an optical concentration element, so as to concentrate the light rays emitted by the secondary source on the optical distribution element.

13. A headlight according to claim 12, wherein the optical concentration element comprises a secondary convergent lens.

14. A headlight according to claim 12, wherein the optical element comprises a diffractive optical element.

15. A headlight according to claim 12, wherein the optical concentration element comprises a hologram.

16. A headlight according to claim 1, wherein the secondary source is a laser diode which produces an infrared lighting beam.

* * * * *

UNITED STATES PATENT AND TRADEMARK OFFICE
CERTIFICATE OF CORRECTION

PATENT NO. : 6,736,524 B2
DATED : May 18, 2004
INVENTOR(S) : Pierre Albou

It is certified that error appears in the above-identified patent and that said Letters Patent is hereby corrected as shown below:

<u>Column 6,</u>
Lines 38 and 50, delete the second "the" after the words "wherein the".
Line 60, delete the word "fact" and insert the word -- face --.

Signed and Sealed this

Thirtieth Day of November, 2004

JON W. DUDAS
*Director of the United States Patent and Trademark Office*